United States Patent [19]

Mullenhoff et al.

[11] Patent Number: 4,586,138

[45] Date of Patent: Apr. 29, 1986

[54] ROUTE PROFILE ANALYSIS SYSTEM AND METHOD

[75] Inventors: Donald J. Mullenhoff; Stephen W. Wilson, both of Livermore, Calif.

[73] Assignee: The United States of America as represented by the United States Department of Energy, Washington, D.C.

[21] Appl. No.: 403,161

[22] Filed: Jul. 29, 1982

[51] Int. Cl.⁴ .................. G01B 5/28; G06F 15/20
[52] U.S. Cl. .................. 364/424; 364/571; 73/105; 73/146
[58] Field of Search .............. 364/424, 426, 444, 449, 364/460, 571; 73/105, 146, 178 R; 340/988; 33/DIG. 3

[56] References Cited

U.S. PATENT DOCUMENTS

| | | | |
|---|---|---|---|
| 3,903,735 | 9/1975 | Wilson | 73/105 |
| 3,983,746 | 10/1976 | Phillips | 73/105 |
| 4,066,877 | 1/1978 | Virnot et al. | 364/426 |
| 4,067,061 | 1/1978 | Juhasz | 364/424 |
| 4,083,052 | 4/1978 | Metcalf | 324/171 |
| 4,084,241 | 4/1978 | Tsumura | 364/460 |
| 4,188,618 | 2/1980 | Weisbart | 364/424 |
| 4,236,215 | 11/1980 | Callahan et al. | 364/424 |
| 4,244,514 | 1/1981 | Nomura et al. | 364/424 |
| 4,258,421 | 3/1981 | Juhasz et al. | 364/424 |
| 4,356,638 | 11/1982 | McKenna et al. | 33/DIG. 3 |
| 4,356,726 | 11/1982 | Yoshino | 73/146 |
| 4,367,453 | 1/1983 | Kuno et al. | 364/424 |
| 4,422,322 | 12/1983 | Spangler | 73/146 |

OTHER PUBLICATIONS

"Route Profile Study", SRI International Final Report, Jan. 1979.
"Characteristics of Urban Bus Driving Cycles", Society of Automotive Engineers, Jan. 10-14, 1972.
"Route Profile Analysis to Determine Suitability of Electric Postal Delivery Vehicles", by Walter et al., Lawrence Livermore National Lab., UCRL-86707, 5-82.
"Route Profile System Final Report", by Walter et al, UCID-19225, Lawrence Livermore National Lab., Nov. 1981.
"Operation and Maintenance Manual-Route Profile Analysis System", Lawrence Livermore Lab., Sep. 1981, Manual 126.
"Route Profile Analysis System Aids U.S. Postal Service", Electronics Engineering Dept. Quarterly Report No. 3-1981, Lawrence Livermore National Lab.

Primary Examiner—Gary Chin
Attorney, Agent, or Firm—Clifton E. Clouse, Jr.; Roger S. Gaither; Judson R. Hightower

[57] ABSTRACT

A system for recording terrain profile information is disclosed. The system accurately senses incremental distances traveled by a vehicle along with vehicle inclination, recording both with elapsed time. The incremental distances can subsequently be differentiated with respect to time to obtain acceleration. The acceleration can then be used by the computer to correct the sensed inclination.

8 Claims, 7 Drawing Figures

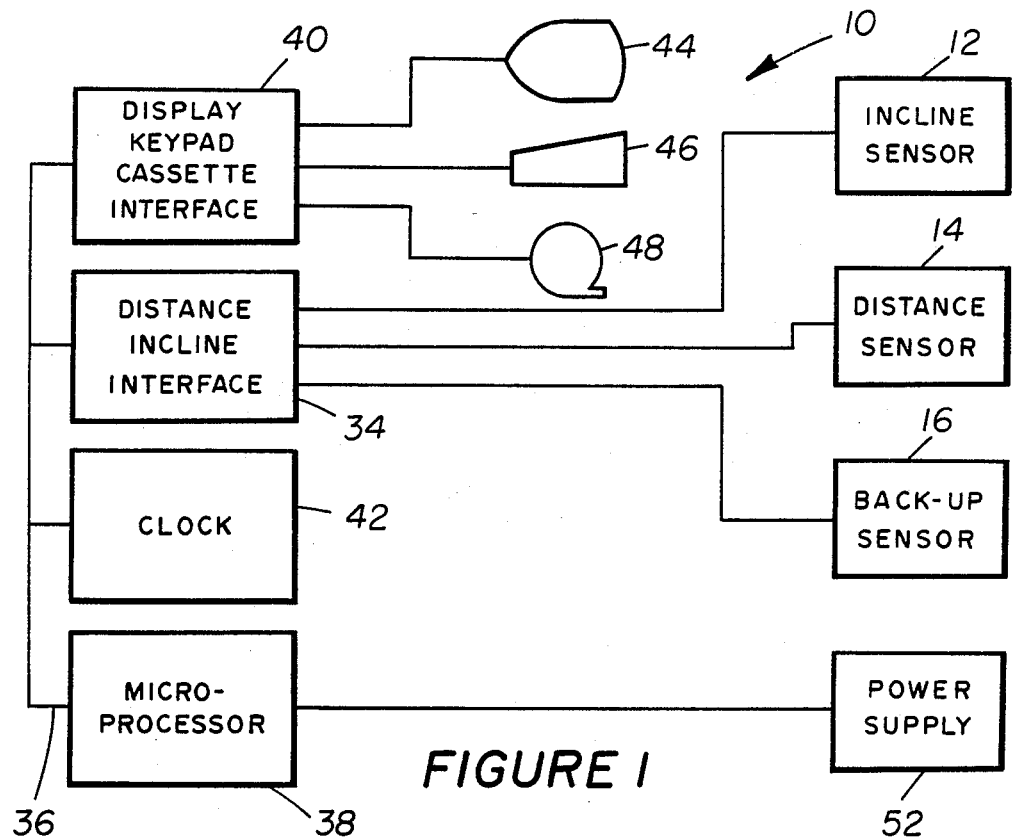
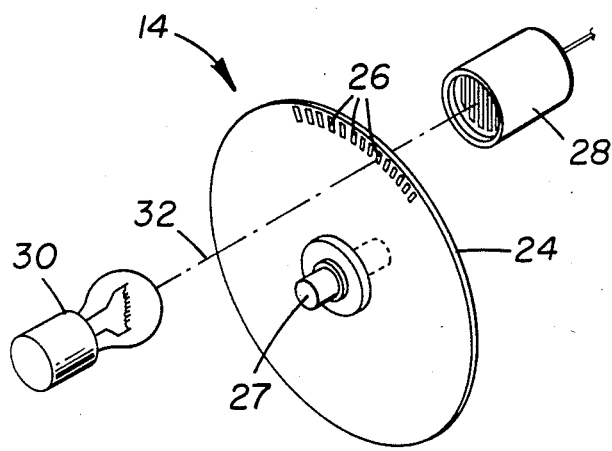
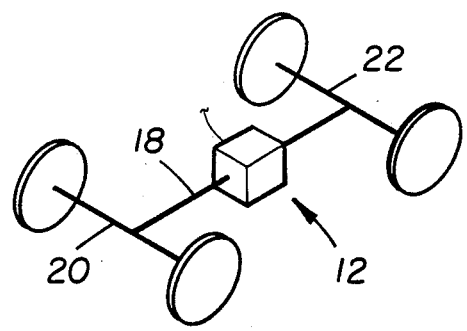
FIGURE 1
FIGURE 2
FIGURE 3

ROUTE PROFILE ANALYSIS SYSTEM AND METHOD

The United States Government has rights in this invention pursuant to Contract No. W-7405-ENG-48 between the U.S. Department of Energy and the University of California for operation of the Lawrence Livermore National Laboratory.

BACKGROUND OF THE INVENTION

This invention relates to the acquisition and storage of information relating to vehicle travel and in particular relates to the acquisition of storage of information including terrain information of a route traveled by a vehicle.

Collection of information relating to vehicle performance is relatively well known. Equipment to gather information relating to distance, speed, vehicle performance and the like has been developed over a period of years by the trucking industry for several reasons. The most important reason to the trucking industry is to ensure that the trucks operate in an efficient manner and within the confines of the laws specified for highway travel. Further, regulations of the Interstate Commerce Commission and other governing bodies may require reports on over-the-highway vehicle usage. It is expedient, therefore, to provide an automated system to record this data rather than to require the operator of the vehicle to meticulously keep an extensive log of vehicle travel.

With the advent of higher fuel prices, it is appropriate to investigate alternate sources to power roadable vehicles. One such alternate source of energy is the storage battery. Electric powered vehicles have a long history in the United States, however, their efficiency has never reached the point where it has proved economical to utilize batteries as a viable source of energy for roadable commercial vehicles. One serious drawback to electric powered vehicles is the requirement to recharge the batteries. This generally takes a relatively long period of time. Recharging is absolutely necessary after a specific period of operation measured either in hours of operation or distance traveled or in electrical terms, after so many ampere-hours of use. Because of these limitations the use of battery power would be particularly appropriate for a vehicle that had a relatively regular schedule such as a delivery truck or the like.

The range of a battery powered vehicle is seriously degraded when the terrain over which the vehicle travels includes hills which require an extensive amount of energy in comparison to level travel. While some conservation can be obtained by converting the motor to a generator on the downhill portions of the route, the overall drain on the batteries is effected by the terrain profile.

Previous vehicle profile information systems, while providing relatively accurate information on distance, fail to provide information on road inclination, acceleration and combinations of these parameters such as grade/distance profiles, acceleration/distance profiles, integrated grade/distance profiles, power requirements and so forth.

In order to evaluate delivery routes to determine if battery powered vehicles are efficient, it is necessary to predict the power requirements of the vehicle so that a vehicle having sufficient stored power can operate over that route and return to its garage without completely discharging the batteries. In the past, accurate power estimates have not been possible because of relatively inaccurate grade information.

DISCLOSURE OF THE INVENTION

The present invention is directed to overcoming one or more of the problems as set forth above.

In one aspect of this invention, a vehicle data acquisition system is disclosed which includes means for sensing the distance traveled by a vehicle and means for periodically sensing the inclination of the longitudinal axis of the vehicle relative to a horizontal plane. The acquisition system also includes a microprocessor for digitally recording the measured distance and the sensed inclination.

As can be seen, it is an object of this invention to provide vehicle data that includes accurate information on the inclination of the vehicle during its movement in order to establish a route profile.

BRIEF DESCRIPTION OF THE DRAWINGS

FIG. 1 illustrates a schematic diagram of an embodiment of the present invention showing the various sensors involved.

FIG. 2 is a schematic representation of the distance sensing means utilized in this invention.

FIG. 3 illustrates the placement of the incline sensing device utilized in this invention.

BEST MODE OF CARRYING OUT OF THE INVENTION

Figure 4:
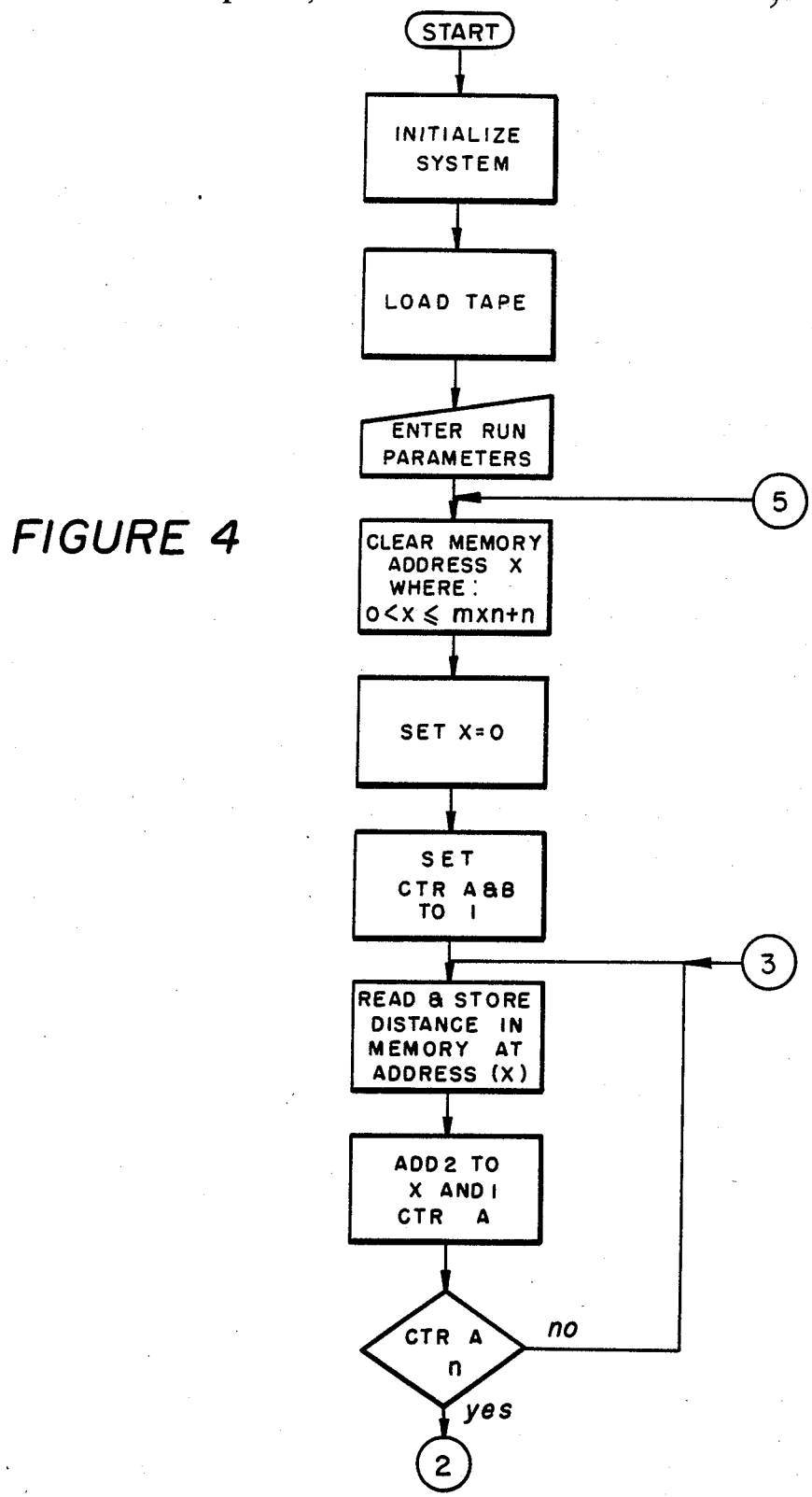
FIGS. 4, 5 and 6 are flow diagrams of the software utilized in this invention.

Referring now to FIG. 1, a schematic of a vehicle data acquisition system 10 is illustrated. Data acquisition system 10 includes three sensing elements, an incline sensor 12, a distance sensor 14 and a backup sensor 16.

Incline sensor 12 is a mechanically damped pendulum that is mounted on a beam 18 (FIG. 3) interconnecting the front axle 20 and the rear axle 22 of a vehicle. It should be understood that beam 18 could be affixed to the vehicle in a longitudinal manner in any horizontal orientation rather than between the axles, but the vehicle's suspension characteristics must then be included in the Data Reduction Program. Some vehicles, with extreme body pitch, cannot be modeled accurately enough to be acceptable. The axles are selected because of ease of installation, and an increase in inclination resolution. Incline sensor 12 includes a damped pendulum that acts electrically as a potentiometer with resistance proportional the pendulum angle and includes a voltage to frequency converter. In the particular embodiment described herein, an appropriate pendulum that meets the criteria for this use is manufactured by Humphrey, Inc. at 9212 Balboa Avenue, San Diego, Calif. 92123. The particular model used in this application was a CP17 Series unit with a range of plus or minus 20 degrees. It is sealed in a fluid to provide viscous damping and is installed in an insulated box when mounted with integral heat to maintain the pendulum at a uniform temperature. The pendulum is overdamped with a damping range of about 6.4 and a time constant of 0.56 seconds at 110 degrees F. At 32 degrees F. the time constant is approximately 0.73 seconds. An overdamped pendulum was selected to reduce signal noise.

Electronically, the Humphrey pendulum behaves as a 5K potentiometer with the resistance proportional to the pendulum angle. A voltage to frequency converter converts the output to provide 5 kHz at minus 20 degrees and 10 kHz at plus 20 degrees with center frequency of 7.5 kHz at 0 degrees. This conditioned signal is obtained by electronic circuitry well known in the art which will not be further described herein.

A distance sensor 14 is shown schematically in FIG. 2. Distance sensor 14 includes a transparent or translucent disc 24 that has inscribed thereon a plurality of opaque radiating markers 26 which are equally spaced. Conveniently, there may be a 256 markers so that a partial rotation may be represented digitally by an 8 bit byte. Disc 24 is adapted to be mounted so that rotation of disc 24 is proportional to the rotation of the drive shaft or rear axle of the vehicle. Conveniently, disc 24 may be mounted in the speedometer cabling of the vehicles. Axle 27 in FIG. 2 represents a portion of the speedometer cable of a vehicle.

Distance sensor 14 also includes a photo-optic sensor 28 and a light source 30. As can be seen in FIG. 2 the light source 30 is positioned on one side of disc 24 and the photo-optic sensor 28 on the opposite side. While necessary focusing lenses and the like may be appropriate, it is not considered necessary to describe such devices as such elements are well known in the art and available commonly.

An appropriate photo-optic sensor is available from TRW OPTRON, 1201 Tappan Circle Carrollton, Tx. 75006. The particular model used in this invention is the TRW High Resolution Slotted Optical Switch model number OPB 813S5. This switch has an aperature of 0.005 in. (0.127 mm) and a frequency response of 10 kHz.

Suffice it to say that rotation of disc 24 interrupts the beam of light 32 emanating from light source 30 so that a pulsed signal is generated from photo-optic sensor 28. By counting the pulses, an accurate measure of the distance traveled may be obtained.

As is evident, the sensed distance a vehicle travels is reduced by the amount the vehicle travels in a reverse direction. Accordingly, it is appropriate to include in the acquisition system a backup sensor 16 which in the present instance is accomplished by tapping the "backup lights" of the vehicle involved. Thus, whenever the vehicle is placed in reverse, the "backup lights" (not shown) will be lighted and concurrently a signal is generated by the backup sensor. More will be said about this function in the description of the operation of the system.

The sensors, incline sensor 12, distance sensor 14 and backup sensor 16 send their respective signal to a distance interface for further communication to a data bus 36. Also associated with data bus 36 is a micro-processor 38, display, key-pad and cassette interface 40 and a clock 42. Micro-processor 38 is any convenient processor. In this particular application, the micro-processor is an RCA Model CDP18S603 having 1,024 bytes of random access memory. The micro-processor is configured to include four EPROMS to contain system software.

Figure 7:
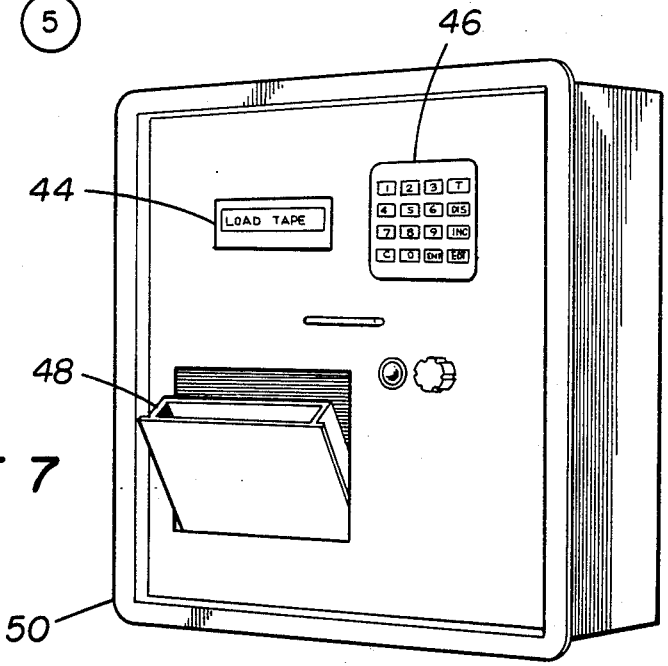
FIG. 7 is an elevation view of the control console.

Display, key-pad and cassette interface 40 interconnect a display device 44 which may be a CRT or, in this particular instrument, a plurality of liquid crystal display devices which reflect the input of keys of a key-pad 46 and are used to provide information to the user such as commands associated with loading and the like. In particular application described herein, the key-pad includes the 10 digits, 0-9, and six command keys (see FIG. 7). These command keys, which will be described in the description of the operation include inquiries for determining the time and the distance traveled and the inclination. They also include a key to mark the end of a tape and a key to enter data when the data display on the display device 44 indicates that data is to be entered into the micro-processor.

A tape drive unit is also included in vehicle data acquisition system 10. The tape transport 40, which includes a recording capability, is manufactured under the trade name Braemer Computer Device Model CD200. This tape recording transport uses a standard Phillips 300 foot digital cassette with index holes at the end of each tape. Other tape drives or data storage devices would also be appropriate.

The display/key-pad/cassette interface 40 is contained along with distance incline interface 34, and the micro-processor 38 and the clock 42 in a container 50 that has on its face, key-pad 46 and a display device 44 and access for the cassette transport 48.

Finally, a power supply 52 is provided in this system. This power supply 52 may draw its source of energy from the vehicle battery and may include appropriate circuitry to provide power as required by the system.

The system includes appropriate software so that data sensed by the three sensors, incline sensor 12, distance sensor 14 and backup sensor 16 along with clock 42 may be recorded on a cassette loaded in cassette transport 38. In the particular application described herein the software should include the provisions shown in the flow charts illustrated in FIGS. 4, 5 and 6. Specifically, the software should include a "boot strap" program to initialize the system upon powering up of the micro-processor. If the system has just been installed or if there is reason to believe calibration has not been effected, the system should be calibrated against a known distance and the incline sensor should be leveled or checked against a known level. Once the cassette tape is loaded into the tape transport 48, route parameters should be entered through key-pad 46. Typically, the route parameters would include the start up time, the date and the route number. Then certain housekeeping chores may be taken care of by the software so that data acquisition may commence. In the particular application described herein, the distance is sensed each quarter of a second while vehicle inclination is sensed once a second. While it might be appropriate to provide two memory locations—one for distance and one for inclination data—storage may be achieved in a single memory area wherein the distance measurements are interspersed by the periodic inclination measurements. Since the data is to be stored sequentially on tape, the single memory storage is particularly appropriate.

The basic cycle for this data acquisition system is one second. This one-second interval consists of four quarter-second periods during which the sensors are sampled and the data is placed in a section reserved for memory. This format of data sampling results in four distance sensor readings (one per quarter-second) and one inclination or pendulum reading (taken at the end of the last quarter-second). Conveniently, each of these sensings may consist of 16 bits (two bytes). This amounts to 10 bytes per second. This one-second cycle is repeated 50 times per data block resulting in the storage of 500 bytes of data in memory. Additionally, at the beginning of each block, two bytes of time data are stored. While this application uses a one-second basic cycle and 50 seconds for a data block, it should be understood that other intervals could also be used.

Figure 5:
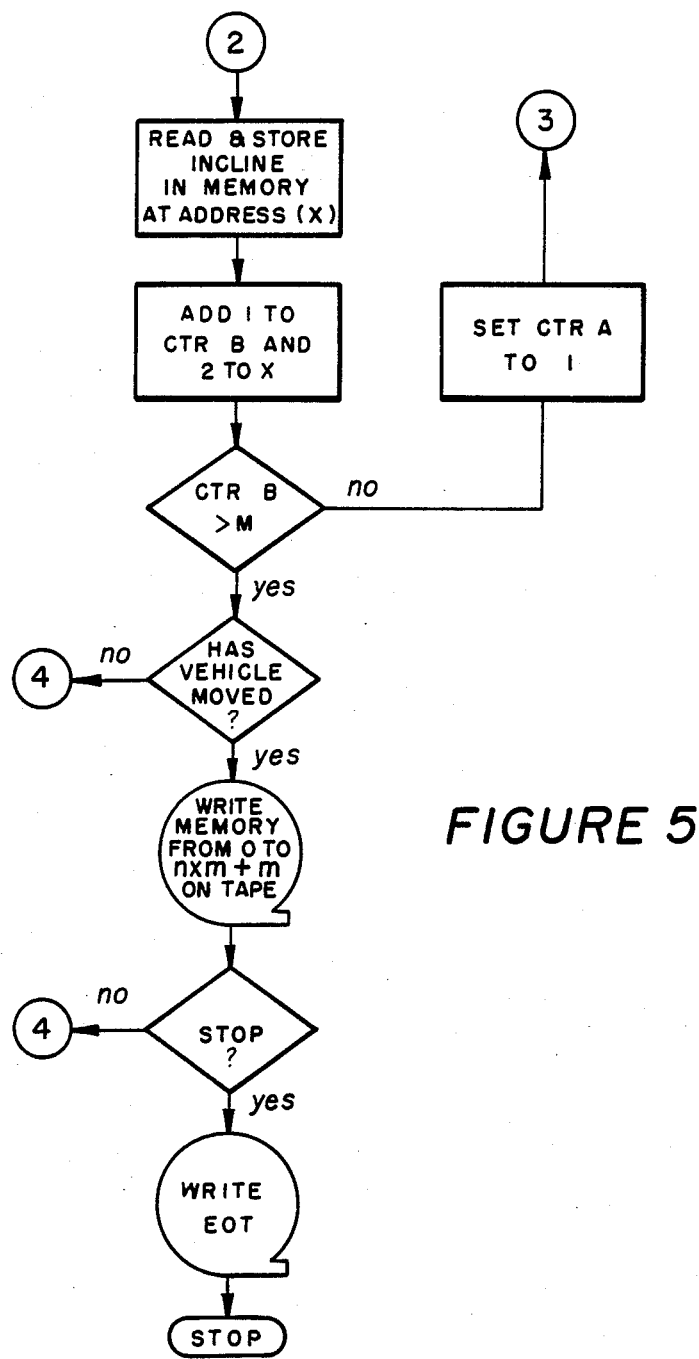

In FIG. 4, for this application, N is equivalent to 4 while M is equivalent to 50 where M and N are generally the time interval constraints set forth above. As can be seen from FIG. 4 and FIG. 5, the data is collected in a memory address until the limit of M (50 seconds) has been reached. If the vehicle has moved, then the data is dumped to a cassette tape. As indicated above, the backup sensor 16 provides information to the microprocessor that the distance (in reverse) is to be ignored. If the vehicle backs, distance is recorded as zero. In order to save tape, data is not dumped to the cassette if the vehicle is stopped. If, on the other hand, the vehicle has moved at any time during the one-minute period that data is collected, then the data storage step takes place.

Figure 6:
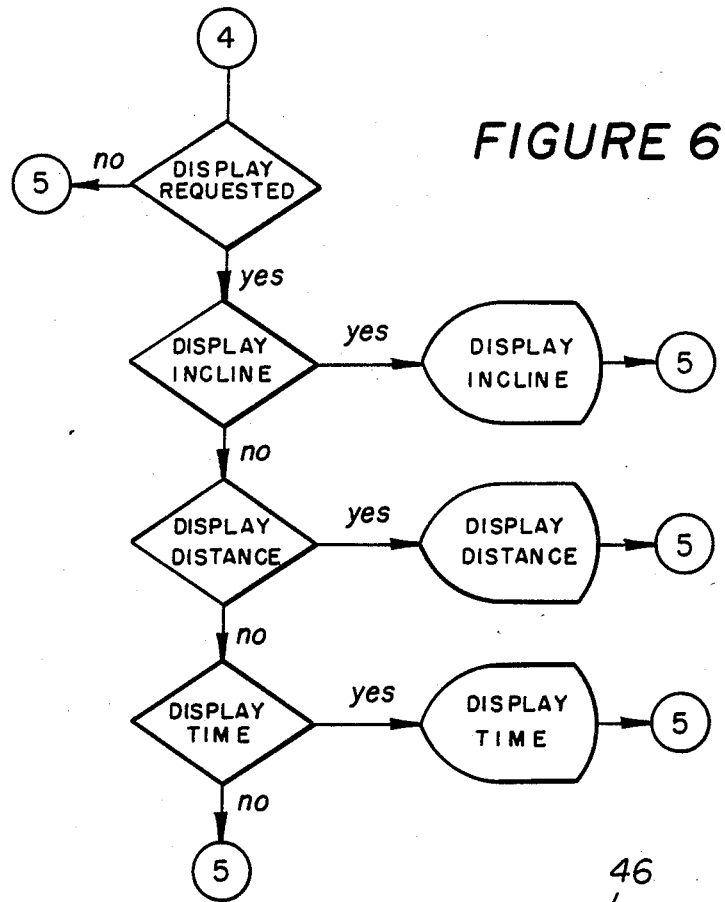

After the data storage is accomplished, the microprocessor will check to see if a stop command has been received from the operator in the form of an end-of-tape (EOT) order. If the operator has completed his route, the tape is closed out with an end-of-tape mark and the program is stopped. If, on the other hand, the operator has requested information to be displayed, the steps illustrated in FIG. 6 are accomplished and the appropriate information displayed on the display device. It should be understood that the display requests can be written into the program to occur in "real time"—that is, at any time during the operation of the program. For convenience sake, they have been placed at the end of the flow chart in FIG. 6 to indicate that such occurrences may take place.

The tape that is prepared by this program is for use in a large computer to provide route information. One of the important bits of information is provided by distance sensor 14 and, in particular, its associated disc 24 which provides a very accurate measure of the distance traveled by the vehicle. When used in conjunction with clock pulses from clock 42, the distance information can be differentiated in subsequent computer operations to obtain acceleration data. With acceleration, raw inclination data obtained from incline sensor 12 may be corrected for the effects of acceleration since incline sensor 12 utilizes a pendulum incline sensing device. As is well known, as the vehicle accelerates or decelerates, the pendulum is affected by that acceleration or deceleration. Knowing the incremental distance traveled and the time in which that travel is accomplished, the data may then be differentiated to obtain the acceleration, and by using known mathematical principles, the incline may also be otained so that a true grade profile is produced. A discussion of the mathematics involved in the reduction of data obtained by this invention to obtain the true grade profile may be found in Lawrence Livermore National Laboratory report UCRC 86707 dated May, 1982, authored by C. E. Walter, M. K. Kong and D. J. Mullenhoff. This report entitled "Route Profile Analysis to Determine Suitability of Electric Postal Delivery Vehicles" is available at Lawrence Livermore National Laboratory, P.O. Box 808, Livermore, Calif. 94550.

In order to obtain the necessary accuracy, disc 24 is divided into a plurality of segments 26. In this particular instance, it has been found appropriate to divide the disc into 256 segments.

Industrial Applicability

The description above includes sufficient information so that one skilled in the art can practice this invention. However, it is appropriate to provide a particular illustration.

This particular system is appropriate for use in determining the route profile of a regularly traveled route. It is particularly appropriate for use by the United States Postal Service in determining the applicability of electrically driven vehicles or the like over a particular route. Thus, the equipment is installed in a standard postal delivery vehicle and operated by the operator of the vehicle. In particular, the operator will initialize the system by putting in route information such as time, date and the like. After the run parameters are entered, the system will immediately go into its operate mode clearing the memory addresses as indicated in FIG. 4 and periodically reading and storing distance in consecutive memory addresses. After reading a particular number of sensed distances and storing them in consecutive addresses, the program will read an incline indication from the incline sensor 12. As noted above, for every four distance measurements, one incline measurement is taken. It should be understood that this ratio may vary in accord with the software developed for the system as described in Lawrence Livermore publication Route Profile Analysis System—Final Report, September, 1981, UCID 19225.

After a particular number of cycles, in this instance 50, the software provides for erasing the data obtained if the vehicle has not moved. This is primarily to save tape. If the vehicle has moved, the entire block of stored distance, time and inclination data is written on tape.

At the end of the route, the operator will make an indication on his console so that the tape may be closed out with an appropriate end-of-tape mark. At any time during the operation of the system, the operator may request certain information as to the incline currently being recorded, the distance that has been driven or the elapsed time of the recording.

As far as the hardware is concerned, the incline sensor 12, as previously noted, operates electronically as a potentiometer providing a square wave having a particular frequency associated with the angle of the pendulum in the incline sensor. The distance sensor 14 senses distance by the interruption of a light beam 32 by a plurality of opaque radial markers 26 on disc 24. These interruptions in conjunction with pulses from clock 42 provide an accurate measure of distance of vehicle travel and allow for subsequent differentiation to obtain acceleration information. Backup sensor 16 ensures that only the forward distance traveled by the vehicle is recorded.

Information obtained from this system and recorded on recorded cassette tape may be subsequently used to obtain information relating to the route parameters. In particular, a time/distance profile may be generated along with a speed/distance profile. As previously noted, the time/distance parameter may be differentiated in a subsequent computer operation to obtain information on acceleration of the vehicle. Knowing the acceleration, a grade/distance profile may be generated by correcting the sensed vehicle inclination. Integrating the grade/distance information, provides an accurate cross-sectional profile of the route traveled. Finally, knowing the above parameters and knowing the operating characteristics of a particular vehicle, the vehicle power requirements may be predicted. This includes such information as battery power requirements, battery state-of-charge requirements and the like.

These calculations may be made in the following manner. Velocity and acceleration are calculated from the distance measurements during the data reduction process. Velocity is calculated from Eq. (1):

$$V = D/T, \qquad \text{Eq(1)}$$

where
V = velocity (m/s),
D = distance traveled during last second (m),
T = time increment (= 1.0 s).

The calculation for velocity is sufficiently accurate for electric vehicle modeling. However, because it is needed in the road grade calculations, acceleration must be calculated more precisely. For the acceleration calculation, a time step of a quarter second is used. The average acceleration for 1 s can then be calculated from Eq. (2):

$$A = (a1 + a2 + a3 + a4 + a5)/5 \qquad \text{Eq(2)}$$
$$= (d5 - d0)/(5t^2),$$

where
$a(i) = [d(i) - d(i-1)]/(t^2)$; average acceleration at the i'th quarter second (m/s$^2$),
$d(i)$ = distance traveled during the i'th quarter second (m),
t = time increment (= 0.25 s).

During each time step, the pendulum angle is calculated for the calculated acceleration, assuming that the road grade is zero. The difference between this value and the measured angle is due to the actual road grade. From this difference, the grade is calculated from the pendulum state equations. At the beginning of the next time step, the pendulum state variables are again calculated to place the pendulum at its known angle, and the grade calculation is repeated as in the previous step. Although pendulum angle is used in the above discussion (because it is the more intuitive), recall that the actual measured parameter is the time integral of the pendulum angle.

The pendulum is modeled as a linearized, second-order dynamic system. However, because the measured output is the average pendulum angle, an additional state variable is added to the analysis making it appear as a third-order system. The additional state variable, the time integral of the pendulum angle, is the parameter which is compared to the measured pendulum angles in the grade calculation algorithm.

The linearized equation of motion for a nonrotating simple pendulum is $$mL^2\ddot\theta + b\dot\theta + mgL\theta = mLa + mgL\phi, \qquad \text{Eq(3)}$$

where
m = pendulum mass (kg),
L = pendulum length (m),
g = 9.8 m/s$^2$,
a = linear acceleration of pendulum (m/s$^2$),
$\theta$ = pendulum angle (rad),
$\dot\theta = d\theta/dt$
$\ddot\theta = d^2\theta/dt^2$,
$\phi$ = road incline (rad),
b = damping coefficient (N.s.m).

Equation (3) is linearized by assuming small angles, and is converted to state space form by introducing the following state variables:

$y1 = \int \theta dt,$ $y2 = \theta,$ $y3 = \dot\theta.$

The resulting state equations are $$\dot y1 = y2, \qquad \text{Eq(4)}$$

$\dot y2 = y3,$ $\dot y3 = a/L - (y2)(g/L) - (y3)(b/mL^2) + (\phi)(g/L).$

The continuous-time elements of Eq. (4) can be converted via standard mathematical analyses to the discrete-time elements of Eq. (5):

$$y1(k+1) = y1(k) + c1 \times y2(k) + c2 \times y3(k) + c3 \times a + c4 \times \phi(k), \qquad (5a)$$

$$y2(k+1) = c5 \times y2(k) + c6 \times y3(k) + c7 \times a + c8 \times \phi(k), \qquad (5b)$$

$$y1(k+1) = c9 \times y2(k) + c10 \times y3(k) \times c11 \times a + c12 \times \phi(k), \qquad (5c)$$

where
y(k) = value of state variable y at time k, k = 1,2,3 . . . ,
y(k+1) = value of state variable y at time k+1,
$\phi$(k) = value of road incline at time k,
c1 . . . c12 = constant.

Equation (5) is used to predict the pendulum angle and road grade for each time increment of the vehicle route. At each step, $\phi$ is calculated with Eq. (5a) from the measured value of y1(k+1) and the known values of the state variables from the previous step (y1(k), y2(k), and y3(k)). This value of $\phi$ is then inserted into Eqs. (5b) and (5c) to calculate y2(k+1) and y3(k+1), which then become the state variable inputs for the next time step.

The values of the pendulum parameters m, L, and b, are determined by measuring the pendulum step response, and selecting appropriate values which reproduce the measured time response. The state equation coefficients are then determined from these parameters.

Other aspects, objects and advantages of this invention can be obtained from a study of the drawings, the disclosure and the appended claims.

What is claimed:

1. A vehicle data acquisition system comprising:
distance measuring means for measuring the distance traveled by a vehicle per unit time;
means for periodically sensing the inclination of the longitudinal axis of the vehicle relative to the horizontal plane;
micro-processor means for digitally recording the measured distance and the sensed inclination, said recorded measured distance and sensed inclination to be used to determine the profile of a route traveled by the vehicle with said distance measuring means and said inclination sensing means providing sufficient data to determine true inclination of the vehicle over all portions of the route.

2. The vehicle data acquisition system of claim 1 wherein the inclination sensing means includes:
a beam adapted for a fixture between the front and rear axles of a two-axled vehicle;
pendulum means mounted on said beam.

3. The vehicle data acquisition system of claim 2 wherein said pendulum means includes a damped pendulum and a potentiometer, said potentiometer producing a voltage proportional to the pendulum angle and means for converting said voltage to a frequency.

4. The vehicle data acquisition system of claim 1 wherein said distance measuring means comprises a disc physically associated with the drive shaft of a vehicle and mounted to rotate in proportion to the rotation of said drive shaft.

5. The vehicle data acquisition system of claim 4 wherein said disc is at least translucent and has a plurality of radial opaque indicia thereupon and further wherein said distance measuring means comprises a light source mounted on one side of said disc and a photo-optic sensor mounted on the other side of said disc.

6. The combination of claim 4 further including means for sensing the direction of vehicle travel; said direction sensing means interrupting the recordation of measured distance and sensed inclination while said vehicle is travelling in a reverse direction.

7. A method for determining the terrain profile of a route traveled by a vehicle comprising the steps of:
   a. sensing the distance traveled by the vehicle in a first predetermined time interval;
   b. recording the time and the distance traveled in the first predetermined time interval;
   c. sensing the vehicle inclination by gravity means at a predetermined time;
   d. recording the sensed vehicle inclination;
   e. repeating the aforesaid steps for a second predetermined period of time relatively longer than said first predetermined time;
   f. differentiating twice with respect to time the sensed distances traveled as sensed in step a to obtain vehicle acceleration;
   g. correcting the recorded sensed vehicle inclination using the obtained vehicle acceleration for that predetermined time to eliminate the effects of vehicle acceleration on the gravity inclination sensing means and thereby obtian true vehicle inclination.

8. A vehicle data acquisition system comprising:
distance measuring means for measuring the distance traveled by a vehicle per unit time;
means for periodically sensing the inclination of the longitudinal axis of the vehicle relative to the horizontal plane;
micro-processor means for digitally recording the measured distance and the sensed inclination;
and for differentiating twice with respect to time of the recorded measured distance to obtain vehicle acceleration, said vehicle acceleration and said sensed inclination usable to determine the actual inclination of the route over which the vehicle traveled.

* * * * *